US008773380B2

(12) United States Patent
Li

(10) Patent No.: US 8,773,380 B2
(45) Date of Patent: Jul. 8, 2014

(54) DISPLAY INTERFACE UPDATING METHOD FOR TOUCH SCREEN AND MULTIMEDIA ELECTRONIC DEVICE

(75) Inventor: Yuanyuan Li, Qingdao (CN)

(73) Assignee: HiSense Mobile Communications Technology Co., Ltd., Shandong (CN)

( * ) Notice: Subject to any disclaimer, the term of this patent is extended or adjusted under 35 U.S.C. 154(b) by 209 days.

(21) Appl. No.: 13/383,818

(22) PCT Filed: Apr. 3, 2010

(86) PCT No.: PCT/CN2010/071555
§ 371 (c)(1),
(2), (4) Date: Jan. 12, 2012

(87) PCT Pub. No.: WO2011/006377
PCT Pub. Date: Jan. 20, 2011

(65) Prior Publication Data
US 2012/0139862 A1 Jun. 7, 2012

(30) Foreign Application Priority Data
Jul. 13, 2009 (CN) .......................... 2009 1 0159904

(51) Int. Cl.
G09G 5/00 (2006.01)
(52) U.S. Cl.
USPC .......................... 345/173; 178/18.03; 715/864
(58) Field of Classification Search
USPC ............. 345/173; 178/18.03–18.07; 715/863, 715/864
See application file for complete search history.

(56) References Cited

U.S. PATENT DOCUMENTS

| 4,988,982 A * | 1/1991 | Rayner et al. ................. 345/173 |
| 8,272,957 B2 * | 9/2012 | Crowder et al. ................. 463/32 |
| 2008/0168478 A1 | 7/2008 | Platzer et al. |
| 2009/0119613 A1 | 5/2009 | Nakaya |
| 2009/0237421 A1 * | 9/2009 | Kim et al. ..................... 345/661 |
| 2009/0244015 A1 * | 10/2009 | Sengupta et al. ............. 345/173 |

FOREIGN PATENT DOCUMENTS

| CN | 101390037 | 3/2009 |
| CN | 101599001 | 12/2009 |
| JP | 63206827 | 8/1988 |
| JP | 2007328394 | 12/2007 |

OTHER PUBLICATIONS

International Search Report, issued in International Patent Application No. PCT/CN2010/07155, mailed Jun. 3, 2010, 8 pages.
Written Opinion, issued in International Patent Application No. PCT/CN2010/07155, mailed Jun. 3, 2010, 10 pages.
International Preliminary Report on Patentability, issued in International Patent Application No. PCT/CN2010/07155, mailed Jun. 3, 2010, 12 pages.

* cited by examiner

Primary Examiner — Tom Sheng
(74) Attorney, Agent, or Firm — Schwabe Williamson & Wyatt, P.C.

(57) ABSTRACT

An interface updating method for touch screen and a multimedia electronic device are provided, which are used for solving the problem of how to update a display interface of a touch screen according to the slide operating characteristics of a controller. When the controller slides on the touch screen, the operating characteristics of the controller are determined based on the predetermined number of pixel point samples that the slide trail of the controller goes through at last. The interface is updated according to the operating characteristics of the controller. The interface adjustment visually obtains an effect corresponding to the movement of the controller.

20 Claims, 4 Drawing Sheets

DISPLAY INTERFACE UPDATING METHOD FOR TOUCH SCREEN AND MULTIMEDIA ELECTRONIC DEVICE

CROSS REFERENCE TO RELATED APPLICATIONS

This application is a U.S. National Stage of International Application No. PCT/CN2010/071555, filed 3 Apr. 2010, designating the United States, and claiming priority to Chinese Patent Application No. 200910159904.8, filed with the Chinese Patent Office on Jul. 13, 2009 and entitled "Method for updating display interface of touch screen and multimedia electronic device", both of which are hereby incorporated by reference in its their entirety.

FIELD

The present invention relates to the field of electronic devices and particularly to a method for updating a display interface of a touch screen and a multimedia electronic device.

BACKGROUND

Along with the development of portal multimedia electronic device technologies, there are an increasing number of types of multimedia electronic devices with a touch screen. Particularly, the development of a mobile communication terminal with a touch screen as a mobile communication utility is very fast, and the common use of a touch screen technology on a commercial intelligent mobile communication terminal facilitates an operation by a businessman on one hand and embodies user-friendliness on the other hand.

As illustrated in FIG. 1, a display screen of a mobile communication terminal is a touch screen with a resolution of X*Y, that is, there are a number of pixels in a row and a number X of pixels in a column, where X is also referred to as the row height of the touch screen and Y is also referred to as the column width of the touch screen, which typically includes three areas, i.e., a title area, a menu area in which the contents of a menu are displayed, and a soft key area. The resolution of a complete function menu is assumed as P*Q, where P is also referred to as the row height of the function menu and Q is also referred to as the column width of the function menu. If the value of P is larger than the height of the menu area, then all the function menu may not be displayed on the touch screen, but apart of the contents of the menu may be displayed in a display interface on the touch screen, then a user has to switch the display interface by dragging a menu item(s) on the menu with a control body. For example, the complete function menu illustrated, in FIG. 1 has a row height of 120 pixels and includes 10 menu items each with a height of 12 pixels, and the height of the menu area of the touch screen is 50 pixels, then, when the menu items on the menu are dragged with a control body to slide downward, the updated display contents are positioned above the current display contents of the function menu, the location where the contents of the menu to be displayed reside among the contents of the entire menu is positioned in the function menu according to the operation of the control body and then the touch screen is updated and the display interface is switched.

How to adjust the display interface of the touch screen in combination with the characteristic of a sliding operation of a control body is a problem to be considered for updating the display interface of the touch screen.

SUMMARY

Embodiments of the invention provide a method for updating an interface of a touch screen of a multimedia electronic device and a multimedia electronic device to address the problem of how to adjust the display interface of the touch screen according to the characteristic of a sliding operation of a control body.

A method for updating an interface of a touch screen includes:

a first operation of determining, from location information on coordinates of and time information on a last preset number of sampled pixel points through which a sliding trace of a control body sliding on the touch screen passes, a distance over which and a period of time in which the control body slides from the first one to the last one of the sampled pixel points in a movement direction of the display interface;

a second operation of determining, from the distance and the period of time, the highest speed $v_0$ at which the control body slides with a zero initial speed and a constant acceleration $a_0$ starting from the first sampled pixel point to the last sampled pixel point and the acceleration $a_0$; and a third operation of periodically determining a step by which a menu is adjusted and updating the display interface at a preset interval T of updating the interface assuming that the interface slides starting with an initial speed of $v_0$ or of the product of $v_0$ and a first weight and with a deceleration of $a_0$ or of the product of $a_0$ and a second weight after the control body is released so that the display interface is updated with an effect of decelerated sliding until it stops at an optimum display location, wherein a period of time in which the interface slides between two consecutive instances of updating thereof is preset to $T_0$.

Preferably the first operation includes:

determining the size of a space of sampled pixel points and clearing the space of sampled pixel points upon capturing a signal that the touch screen is touched with the control body;

sampling the sliding trace of the control body while being dragged, acquiring the location information on the coordinates of the sampled pixel points and the time information when the pixel points are passed through and updating the space of samples constantly;

determining, from the location information on the coordinates of the first sampled pixel point in the space of samples to come into the space of samples and the last sampled pixel point to come into the space of samples, the distance $s_0$ over which the control body slides from the first one to the last one of the sampled pixel points in the movement direction of the display interface after the control body is released from the touch screen; and determining, from the time information on the first sampled pixel point and the last sampled pixel point, the period of time $t_0$ in which the control body slides from the first sampled pixel point to the last sampled pixel point.

Wherein the second operation includes: $a_0=2s_0/t_0^2$ and $v_0=a_0t_0$.

Preferably in the third operation, the display interface slides starting with an initial speed of $v_0$ and with a deceleration of $a_0$ after the control body is released, and the third operation includes:

B11. triggering a timer for an interval at which the interface is updated, wherein the time-length of the timer is T;

B12. waiting for expiration of the timer;

B13. calculating from $a_0$, $v_0$ and $T_0$ the distance s over which the menu slides in a period of time $T_0$ and the speed v' at which the menu slides at the end of the period of time $T_0$, wherein:

$$s = v_0 T_0 - a_0 T_0^2/2; \text{ and}$$

$$v' = v_0 - a_0 T_0;$$

B14. assigning v' to $v_0$, $v_0 = v'$;

B15. if one of the following four conditions is satisfied, then an operation B17 is executed; otherwise, determining a target display location of the menu from the sliding direction of the control body determined from a space of samples, the current display location of the menu and s, and updating the menu with the target display location;

the first condition of $s \leq 0$;
the second condition of $v_0 \leq 0$;
the third condition of $w \neq 0$ with $n \leq h$; and
the fourth condition of $w < 0$ or $w > (n-h)$ with $n > h$;

wherein w represents the location at which the contents of the menu are currently displayed, the height of the entire menu is a number, n, of pixels, and the height of a menu area of the touch screen is a number, h, of pixels;

B16. waiting for subsequent expiration of the timer, and then wing back to the operation B13;

B17. determining whether none of the following conditions is satisfied, and if so, then ending; otherwise, determining the distance $S_{total}$ between the current display location and the optimum display location, wherein:

$S_{total} = |w|$ for the condition of $w \neq 0$ with $n \leq h$;
$S_{total} = |w|$ for the condition of $w < 0$ with $n > h$; and
$S_{total} = w - (n-h)$ for the condition of $w > (n-h)$ with $n > h$;

B18. determining an adjusting step $S_{step}$ as $S_{step} = S_{total}/Q$, wherein Q is an integer larger than zero;

B19. determining the target display location of the menu from the sliding direction of the control body in the last phase determined from the space of samples, the current display location of the menu and $S_{step}$, and updating the menu with the target display location; and B110. waiting for subsequent expiration of the timer and then going back to the operation B17.

Preferably in the third operation, the display interface slides starting with an initial speed of $v_0$ and with a deceleration of $a_0$ after the control body is released, and the third operation includes:

B21. triggering a timer for an interval at which the interface is updated, wherein the time-length of the timer is T;

B22. waiting for expiration of the timer;

B23. calculating from $a_0$, $v_0$ and $T_0$ the distance s over which the menu slides in a period of time $T_0$ and the speed v' at which the menu slides at the end of the period of time $T_0$, wherein:

$$s = v_0 T_0 - a_0 T_0^2/2; \text{ and}$$

$$v' = v_0 - a_0 T_0;$$

B24. assigning v' to $v_0$, i.e., $v_0 = v'$;

B25. if one of the following four conditions is satisfied, then an operation B27 is executed; otherwise, determining a target display location of the menu from the sliding direction of the control body determined from a space of samples, the current display location of the menu and s, and updating the menu with the target display location;

the first condition of $s \leq 0$;
the second condition of $v_0 \leq 0$;
the third condition of $w \neq 0$ with $n \leq h$; and
the fourth condition of $w < 0$ or $w > (n-h)$ with $n > h$;

wherein w represents the location at which the contents of the menu are currently displayed, the height of the entire menu is a number, n, of pixels, and the height of a menu area of the touch screen is a number, h, of pixels;

B26. waiting for subsequent expiration of the timer, and then going back to the operation B23;

B27. determining whether none of the following conditions is satisfied, and if so, then ending; otherwise, determining the distance $S_{total}$ between the current display location and the optimum display location, wherein:

$S_{total} = |w|$ for the condition of $w \neq 0$ with $n \leq h$;
$S_{total} = |w|$ for the condition of $w < 0$ with $n > h$; and
$S_{total} = w - (n-h)$ for the condition of $w > (n-h)$ with $n > h$;

B28. determining an adjusting step $S_{step}$ as $S_{step} = S_{total}/Q$, wherein Q is an integer larger than zero, and when $S_{step}$ is smaller than a preset minimum adjusting step $S_{min}$, determining $S_{step}$ as $S_{min}$;

B29. determining the target display location of the menu from the sliding direction of the control body in the last phase determined from the space of samples, the current display location of the menu and $S_{step}$, and updating the menu with the target display location; and B210. waiting for subsequent expiration of the timer and then going back to the operation B27.

Preferably in the third operation, the display interface slides starting with an initial speed of the product $v_0'$ of $v_0$ and the first weight and with a deceleration of the product $a_0'$ of $a_0$ and the second weight after the control body is released, and the third operation includes:

B31. triggering a timer for an interval at which the interface is updated, wherein the time-length of the timer is T;

B32. waiting for expiration of the timer;

B33. calculating from $a_0'$, $v_0'$ and $T_0$ the distance s over which the menu slides in a period of time $T_0$ and the speed v' at which the menu slides at the end of the period of time $T_0$, wherein:

$$s = v_0' T_0 - a_0' T_0^2/2; \text{ and}$$

$$v' = v_0' - a_0' T_0;$$

B34. assigning v' to $v_0$, i.e., $v_0 = v'$;

B35. if one of the following four conditions is satisfied, then an operation B37 is executed; otherwise, determining a target display location of the menu from the sliding direction of the control body determined from a space of samples, the current display location of the menu and s, and updating the menu with the target display location;

the first condition of $s \leq 0$;
the second condition of $v_0 \leq 0$;
the third condition of $w \neq 0$ with $n \leq h$ and
the fourth condition of $w < 0$ or $w > (n-h)$ with $n > h$;

wherein w represents the location at which the contents of the menu are currently displayed, the height of the entire menu is a number, n, of pixels, and the height of a menu area of the touch screen is a number, h, of pixels;

B36. waiting for subsequent expiration of the timer, and then going back to the operation B33;

B37. determining whether none of the following conditions is satisfied, and if so, then ending; otherwise, determining the distance $S_{total}$ between the current display location and the optimum display location, wherein:

$S_{total} = |w|$ for the condition of $w \neq 0$ with $n \leq h$;
$S_{total} = |w|$ for the condition of $w < 0$ with $n > h$; and
$S_{total} = w - (n-h)$ for the condition of $w > (n-h)$ with $n > h$;

B38. determining an adjusting step $S_{step}$ as $S_{step} = S_{total}/Q$, wherein Q is an integer larger than zero;

B39. determining the target display location of the menu from the sliding direction of the control body in the last phase determined from the space of samples, the current display location of the menu and $S_{step}$, and updating the menu with the target display location; and B310. waiting for subsequent expiration of the timer and then going back to the operation B37.

Preferably in the third operation, the display interface slides starting with an initial speed of the product $v_0'$ of $v_0$ and the first weight and with a deceleration of the product $a_0'$ of $a_0$ and the second weight after the control body is released, and the third operation includes:

B41. triggering a timer for an interval at which the interface is updated, wherein the time-length of the timer is T;

B42. waiting for expiration of the timer;

B43. calculating from $a_0'$, $v_0'$ and $T_0$ the distance s over which the menu slides in a period of time $T_0$ and the speed v' at which the menu slides at the end of the period of time $T_0$, wherein:

$$s = v_0'T_0 - a_0'T_0^2/2; \text{ and}$$

$$v' = v_0' - a_0'T_0;$$

B44. assigning v' to $v_0$, i.e., $v_0 = v'$;

B45. if one of the following four conditions is satisfied, then an operation B47 is executed; otherwise, determining a target display location of the menu from the sliding direction of the control body determined from a space of samples, the current display location of the menu and s, and updating the menu with the target display location;

the first condition of $s \le 0$;

the second condition of $v_0 \le 0$;

the third condition of $w \ne 0$ with $n \le h$; and the fourth condition of $w < 0$ or $w > (n-h)$ with $n > h$;

wherein w represents the location at which the contents of the menu are currently displayed, the height of the entire menu is a number, n, of pixels, and the height of a menu area of the touch screen is a number, h, of pixels;

B46. waiting for subsequent expiration of the timer, and then going back to the operation B43;

B47. determining whether none of the following conditions is satisfied, and if so, then ending; otherwise, determining the distance $S_{total}$ between the current display location and the optimum display location, wherein:

$S_{total} = |w|$ for the condition of $w \ne 0$ with $n \le h$;

$S_{total} = |w|$ for the condition of $w < 0$ with $n > h$; and $S_{total} = w - (n-h)$ for the condition of $w > (n-h)$ with $n > h$;

B48. determining an adjusting step $S_{step}$ as $S_{step} = S_{total}/Q$, wherein Q is a natural number, and when $S_{step}$ is smaller than a preset minimum adjusting step $S_{min}$, determining $S_{step}$ as $S_{min}$;

B49. determining the target display location of the menu from the sliding direction of the control body in the last phase determined from the space of samples, the current display location of the menu and $S_{step}$, and updating the menu with the target display location; and B410. waiting for subsequent expiration of the timer and then going back to the operation B47.

Preferably T and $T_0$ are equal.

A multimedia electronic device includes:

a unit for determining, from location information on coordinates of and time information on a last preset number of sampled pixel points through which a sliding trace of a control body sliding on a touch screen passes, a distance over which and a period of time in which the control body slides from the first one to the last one of the sampled pixel points in a movement direction of a display interface;

a unit for determining, from the distance and the period of time, the highest speed $v_0$ at which the control body slides with a zero initial speed and a constant acceleration $a_0$ starting from the first sampled pixel point to the last sampled pixel point and the acceleration $a_0$; and a unit for periodically determining a step by which a menu is adjusted and updating the display interface at a preset interval T of updating the interface assuming that the interface slides starting with an initial speed of $v_0$ or of the product of $v_0$ and a first weight and with a deceleration of $a_0$ or of the product of $a_0$ and a second weight after the control body is released so that the display interface is updated with an effect of decelerated sliding until it stops at an optimum display location, wherein a period of time in which the interface slides between two consecutive instances of updating thereof is preset to $T_0$.

Preferably the multimedia electronic device is a mobile communication terminal.

A display interface of a touch screen can be updated according to the characteristic of a sliding operation of a control body in the method for updating an interface of a touch screen according to the embodiment of the invention, where in order to acquire the characteristic of a sliding operation of the control body, a sliding trace of the control body is sampled, the location information on coordinates of and the time information on a last preset number of sampled pixel points through which the sliding trace of the control body passes is used to determine the distance over which and the period of time in which the control body slides from the first one to the last one of the sampled pixel points in the movement direction of the display interface, the highest speed $v_0$ at which the control body slides with a zero initial speed and a constant acceleration $a_0$ starting from the first sampled pixel point to the last sampled pixel point and the acceleration $a_0$ are determined from the sliding distance and the sliding period of time, and further a step by which a menu is adjusted is determined and the interface is updated periodically at a preset interval T of updating the interface when the interface slides starting with an initial speed of $v_0$ or of the product of $v_0$ and a first weight and with a deceleration of $a_0$ or of the product of $a_0$ and a second weight so that the display interface is updated with an effect of decelerated sliding until it stops at an optimum display location, and since the initial speed at which the interface is updated is correlated with the sliding characteristic of the control body in the last phase, the step by which the interface is updated will also be correspondingly large when the control body slides rapidly in the last phase so that the interface will be adjusted with a visual effect corresponding to motion of the control body.

Furthermore according to the technical solution of the embodiments of the invention, the interface can further be adjusted back to an optimum display location when the interface is updated away from the optimum display location so that the interface can be adjusted with a visual effect of being lifting up,

DESCRIBED DESCRIPTION

Referring to FIG. 1 again, when the height of an area on the touch screen for displaying a menu is 50 pixels, all the menu items can not be displayed, but the contents of the menu in 50 pixels at most can be displayed and they may be the contents of 50 pixels starting from any display location w among all the contents of the menu in 120 pixels, this display location w is a target value to be adjusted finally during switching of the menu, and the display location of the contents of the menu and consequently also the contents of the menu displayed on the touch screen will be changed to thereby switch the display interface.

For switching of the display interface, positioning of the target display location refers to determination of the value of the location w with which the display contents of the menu start, and when the height n of the menu is larger than or equal to the height h of the display area of the touch screen, the range of w shall be 0≤w≤b, where b=n−h, for full-screen display. If w is in this range, then the menu area of the touch screen is filled up with the contents of the menu all the time, and the first menu item will be displayed at the top with w=0 and the last menu item will be displayed at the bottom with w=b in extreme scenarios of being up to the top and the bottom of the menu.

Figure 1:
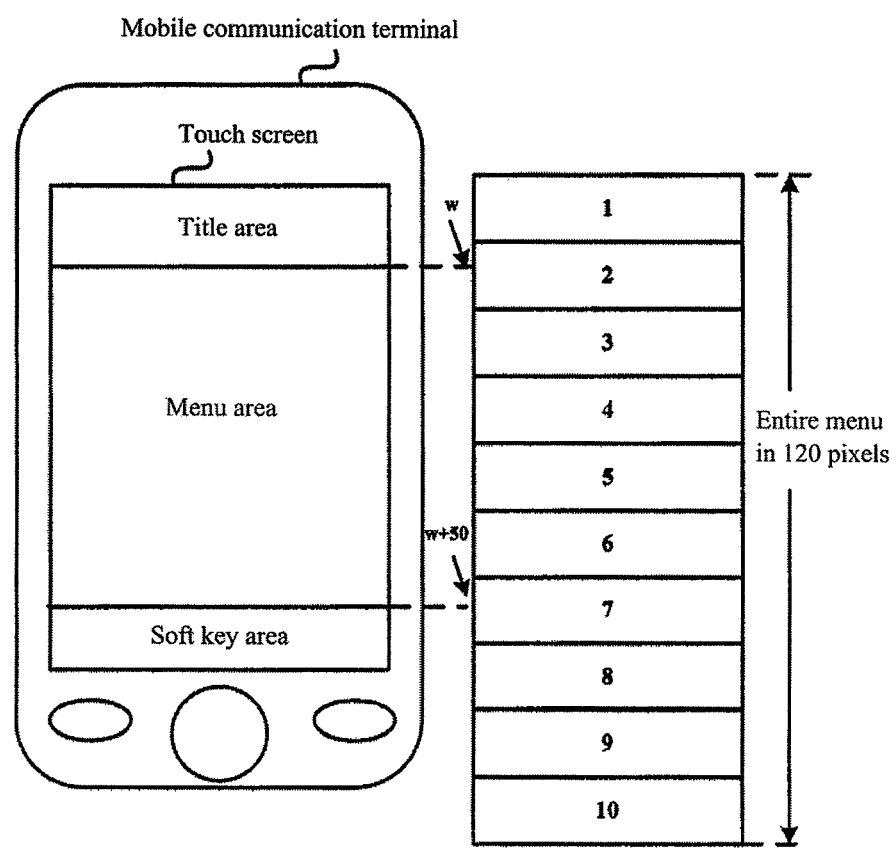
FIG. 1 is a schematic diagram of a touch screen and adjusting of its interface.

As illustrated in FIG. 1, for example, with 0≤w≤70, if w comes into this range, then w is an optimum display location; otherwise, it is not an optimum display location, and a specific example is as illustrated in FIG. 1.

With w=0, the contents of the menu with a height of 50 pixels are displayed starting with the first menu item;

With 0<w<70, the contents of the menu with a height of 50 pixels are displayed starting with the content of the pixel w;

With w=70, the last menu item of the menu is right completely displayed at the bottom of the menu area on the touch screen;

If the display location after the interface is switched comes into any of the foregoing three scenarios, the w shall be positioned at an optimum display location, and when a preset condition under which switching of the interface is terminated is satisfied, the display location will not be adjusted any more.

However, with w<0, there is no content preceding the first menu item of the menu, thus the contents of the range from 0 to −w are also displayed in the menu area on the touch screen, that is, the first menu item of the menu is displayed starting from the location −w of the menu area of the touch screen until the remaining portion of the menu area of the touch screen is filled, a blank is presented at the top of the menu area of the touch screen, and the first menu item of the menu is hung at the middle of the menu area of the touch screen.

With w>b, the contents of only a total number, n−w, pixels start from w in the menu and are already of a smaller height than the height h of the menu area of the touch screen and thus insufficient to fill one full screen, and at this time there is a blank where no content of the menu is displayed at the bottom of the menu area of the touch screen and the last menu item of the menu is hung at the middle of the menu area of the touch screen.

Therefore the display location w shall be adjusted with w<0 and w>b by adjusting the display location w to w=0 with w<0 and to w=b with w>b so that full-screen display will be presented in the menu area of the touch screen.

When the height n of the menu is smaller than the height h of the display area of the touch screen, all the contents of the menu shall finally be displayed starting with the first item of the menu for the display contents of the touch screen no matter however a user drags the menu, and therefore in this case the display location shall be adjusted, if any, to w=0.

In an embodiment of the invention with a better effect of switching, the display contents of the menu are periodically switched progressively by a decreasing step with constantly decelerated motion of the menu after the control body is released, where the initial speed and the deceleration of constantly decelerated motion are determined from a motion characteristic of the control body in a preset last phase, so that such a switching effect can be achieved that the menu will slide slowly until it stops in the end, and when the display location adjusted with constantly decelerated motion is not an optimum display location, the display location of the menu will further be adjusted finally to an optimum display location.

A technical solution according to an embodiment of the invention will be described below in embodiments thereof with reference to drawings.

Figure 2:
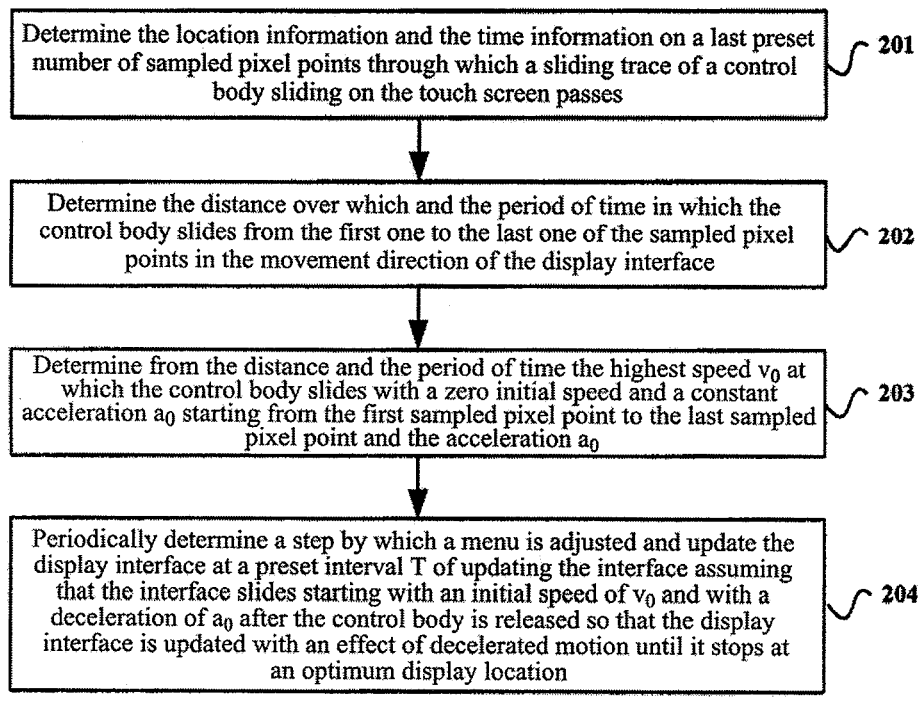
FIG. 2 is a schematic diagram of a flow of a method for updating an interface of a touch screen according to an embodiment of the invention.

As illustrated in FIG. 2, a method for updating an interface of a touch screen according to an embodiment of the invention includes the following operations S201 to S204.

The operation S201 is to determine the location information and the time information on a last preset number of sampled pixel points through which a sliding trace of a control body sliding on the touch screen passes;

The operation S202 is to determine the distance over which and the period of time in which the control body slides from the first one to the last one of the sampled pixel points in the movement direction of the display interface;

The operation S203 is to determine from the sliding distance and the sliding period of time the highest speed $v_0$ at which the control body slides with a zero initial speed and a constant acceleration $a_0$ starting from the first sampled pixel point to the last sampled pixel point and the acceleration $a_0$; and The operation S204 is to periodically determine a step by which a menu is adjusted and update the display interface at a preset interval T of updating the interface assuming that the interface slides starting with an initial speed of $v_0$ and with a deceleration of $a_0$ after the control body is released so that the display interface is updated with an effect of decelerated motion until it stops at an optimum display location, where the period of time in which the interface slides between two consecutive instances of updating thereof is preset to $T_0$.

That is, T represents the interval of time between two instances of updating the interface and $T_0$ represents the fixed period of time preset to calculate the distance over which the menu slides, and $T_0$ and T may be the same or different, for example, $T_0$ may be smaller than T. Generally $T_0$ can takes a value ranging from 0.6 to 1.3 times T, and the smaller value T takes and the larger value $T_0$ takes, the faster the adjusting will be performed.

Figure 3:
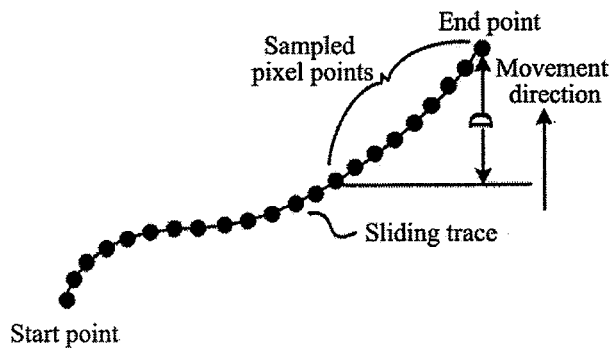
FIG. 3 is a schematic diagram of sampled pixel points of a sliding trace described in an embodiment of the invention.

In the operation S201, the last preset number of sampled pixel points through which the sliding trace of the control body passes are as illustrated in FIG. 3, and it shall be noted that the number of actual samples may be less than the predetermined number when the sliding trace of the control body is short.

A display interface of a touch screen can be updated according to the characteristic of a sliding operation of a control body in the method for updating an interface of a touch screen according to the embodiment of the invention, where in order to acquire the characteristic of a sliding operation of the control body, a sliding trace of the control body is sampled, the location information on coordinates of and the time information on a last preset number of sampled pixel points through which the sliding trace of the control body passes is used to determine the distance over which and the period, of time in which the control body slides from the first one to the last one of the sampled pixel points in the movement direction of the display interface, the highest speed $v_0$ at which the control body slides with a zero initial speed and a constant acceleration $a_0$ starting from the first sampled pixel point to the last sampled pixel point and the acceleration $a_0$ are determined from the sliding distance and the sliding period of time, and further a step by which a menu is adjusted is determined and the interface is updated periodically at a preset interval T of updating the interface assuming that the interface slides stalling with an initial speed of $v_0$ or of the product of $v_0$ and a first weight and with a deceleration of $a_0$ or of the product of $a_0$ and a second weight so that the display interface is updated with an effect of decelerated sliding until it stops at an optimum display location, and since the initial speed at which the interface is updated is correlated with the sliding characteristic of the control body in the last phase, the step by which the interface is updated will also be correspondingly large when the control body slides rapidly in the last phase so that the interface will be adjusted with a visual effect corresponding to motion of the control body. The first weight and the second weight may be the same or different and typically range from 0.6 to 1.3 as appropriate.

Figure 4:
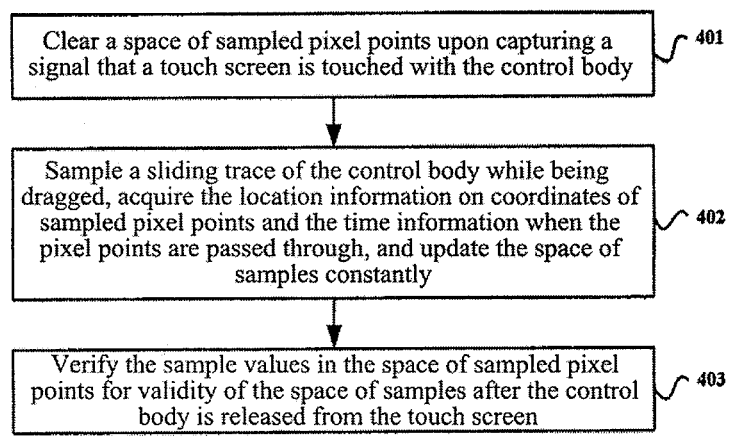
FIG. 4 is a schematic diagram of a flow of a method for sampling pixel points of a sliding trace according to an embodiment of the invention.

As illustrated in FIG. 4, a specific sampling method during sliding motion of a control body includes the following operations S401 to S403.

The operation S401 is to clear a space of sampled pixel points upon taking of a signal that a touch screen is touched with the control body;

The size of the space of sampled pixel points refers to the total number of samples, which is determined from the density of contact locations reported during sliding on the touch screen so that if contact locations are reported frequently from the touch screen during dragging, that is, the contact locations reported while dragging over a specific distance are highly dense, then the space of samples can be enlarged correspondingly; or if the touch screen is not so sensitive and reports contact locations with a lower density, then the space of samples will be reduced because the space of samples is created for the purpose of tracking the characteristic of last several points while a user drags the touch screen to determine a proper direction in which the contents of a menu slides after releasing from the touch screen. If the user constantly drags and moves the menu back and forth, then in this case it might be impossible to reflect the final characteristic of dragging by the user correctly from calculation taking into account all the contact locations occurring during dragging, therefore the space of samples has been adopted.

The operation S402 is to sample a sliding trace of the control body while being dragged, to acquire the location information on coordinates of sampled pixel points and the time information when the pixel points are passed through and to update the space of samples constantly;

The location information and the time information on the sampled pixel points may be referred to as sample values, and the space of samples is updated by adding the sampled pixel points starting from the first location of the space of samples, recording the locations of the current samples in the total space of samples and the total number of the samples and replacing the earliest sample values in the space of samples with the latest ones when the total number reaches a preset number to maintain the sampled pixel points in the space of samples as the last pixel points through which the sliding trace of the control body passes.

The operation S403 is to verify the sample values in the space of sampled pixel points for validity of the space of samples after the control body is released from the touch screen;

The samples are verified for validity primarily for the purpose of verifying in the resultant space of samples the first sample to come into the space of samples and the last sample to come into the space of samples and of using the sample values of the two samples for subsequent calculation.

In the operation S202, the distance $s_0$ over which and the period of time $t_0$ in which the control body slides from the first one to the last one of the sampled pixel points in the movement direction of the display interface are determined respectively from the coordinates of the samples and as the difference between the time information of the two samples. For example:

The sample value of the first sampled pixel point $z_1$ in the space of samples includes the coordinates ($z_{1i}$, $z_{1j}$) and the time information $t_1$;

The sample value of the last sampled pixel point $z_m$ includes the coordinates ($z_{mi}$, $z_{mj}$) and the time information $t_m$, where m represents the size of the space of samples.

Then the sliding distance $s_0$ is calculated as follows:

$s_0 = z_{mj} - z_{1j}$ when the display interface moves longitudinally on the touch screen and $s_0 = z_{mi} - z_{1i}$ when the display interface moves transversely on the touch screen;

The period of time $t_0$ for sliding from the first sampled pixel point to the last sampled pixel point is calculated as $t_0 = t_m - t_1$;

The operation characteristic of the control body in the last phase is extracted from the sample values in the space of sampled pixel points, as described particularly in the operation S203, by determining from the sliding distance and the sliding period of time the highest speed $v_0$ at which the control body slides with a zero initial speed and a constant acceleration $a_0$ starting from the first sampled pixel point to the last sampled pixel point and the acceleration $a_0$, which is described as follows still taking the foregoing example:

The following equations hold for constantly accelerated motion:

$$s = vt + at^2/2 \qquad (1)$$

$$v_0 = v + at \qquad (2)$$

$t_0$ and $s_0$ are substituted into the equation (1), and assumed v=0, then $a_0 = 2s_0/t_0^2$; and $a_0$ and $t_0$ are substituted into the equation (2), and assumed v=0, then $v_0 = a_0 t_0$.

$a_0$ and $v_0$ calculated as above can be taken as an initial deceleration and an initial speed at the moment of time when adjusting of the interface is started, and with T representing an interval at which the interface is updated, the distance over which the interface slides in the period of time $T_0$ and the resultant sliding speed are calculated, from $a_0$ and $v_0$ at the interval of updating the interface:

The following equations hold or constantly decelerated motion:

$$s = vt - at^2/2 \qquad (3)$$

$$v_0 = v - at \qquad (4)$$

$v_0$, $a_0$ and $T_0$ are substituted into the equation (3), and the sliding distance in the period of time $T_0$ is calculated;

The sliding speed at the end of the period of time $T_0$ is calculated in the equation (4) as an initial speed for subsequent adjusting; and there urea variety of methods for providing the display interface with an effect of decelerated sliding, a description will firstly be given below of display interface of the touch screen sliding up and down by way of an example.

Figure 5:
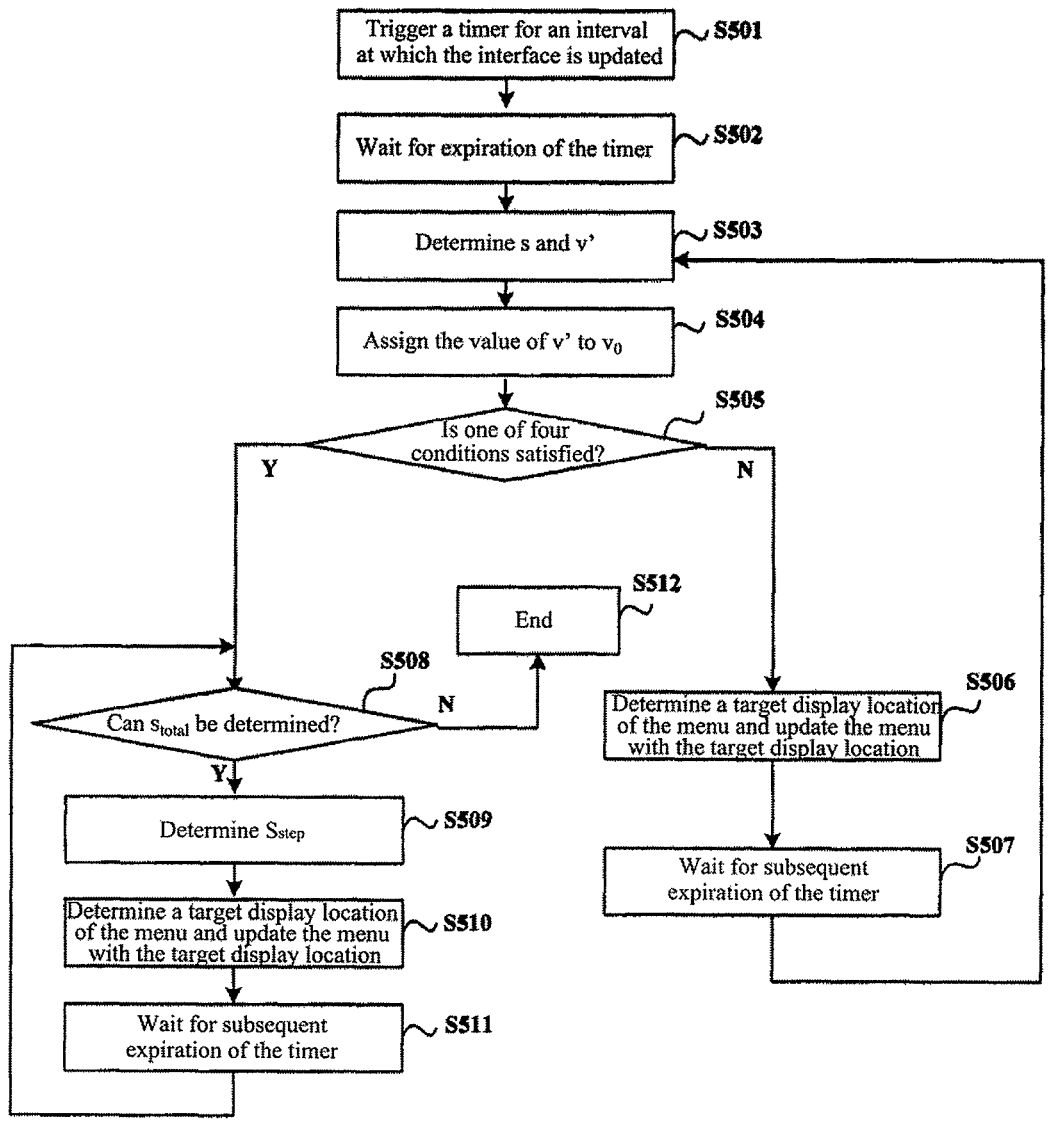
FIG. 5 is a schematic diagram of a specific flow of updating an interface according to an embodiment of the invention.

As illustrated in FIG. 5, a specific flow of adjusting a display location of an interface includes the following operations S501 to S511.

The operation S501 is to trigger a timer for an interval at which the interface is updated, where the time-length of the timer is T;

The operation S502 is to wait for expiration of the timer;

The operation S503 is to calculate the distance s over which a menu slides in a period of time $T_0$ and the speed v' at which the menu slides at the end of period of time $T_0$ from $a_0$, $v_0$ and the determined $T_0$, where s is calculated in the equation (3) as:

$$s = v_0 T_0 - a_0 T_0^2 / 2;$$

v' is calculated in the equation (4) as:

$$v' = v_0 - a_0 T_0,$$

The operation S504 is to assign the value of v' to $v_0$, that is, $v_0 = v'$;

The operation S505 is to determine whether one of the following four conditions can be satisfied, and if so, then the flow goes to the operation S508 of coming to an adjusting phase; or if none of them is satisfied, then the flow goes to the operation S506;

$$s \leq 0 \quad (1);$$

$$v_0 \leq 0 \quad (2);$$

$w \neq 0$ with $n \leq h$ indicates that the menu shall be but is not displayed at the top (3); and $w < 0$ or $w > (n-h)$ with $n > h$ indicates that the menu is not displayed with the beginning thereof at the top or with the end thereof at the bottom (4), Particularly w represents the location at which the contents of the menu are currently displayed, the height of the entire menu is a number, n, of pixels, and the height of a menu area of a touch screen is a number, h, of pixels.

The operation S506 is to determine a target display location of the menu from the sliding direction of a control body in the last phase determined from a space of samples, the current display location of the menu and s and to update the menu with the target display location;

With the sliding direction of the control body in the last phase determined from the space of samples, the target display location of the menu shall be the current display location plus s and the display location of the updated menu will be w=w+s when the sliding direction of the control body in the last phase is upward, and on the contrary, the target display location of the menu shall be the current display location minus s and the display location of the updated menu will be w=w−s when the sliding direction of the control body in the last phase is downward;

None of the foregoing four conditions being satisfied indicates that the display location of the previously updated menu remains in a range of optimum display locations, and s remaining larger than 0 or $v_0$ remaining larger than 0 as calculated for the current updating interval indicates that the menu shall remain in decelerated motion, and the display contents of the menu will be updated with w=w+s or w=w−s for the menu with the characteristic of constantly decelerated motion.

Among the foregoing conditions, when the condition (1) or (2) is satisfied, it indicates that the menu shall remain in constantly decelerated motion until it stops normally, and when the condition (3) or (4) is satisfied, it indicates that adjusting with constantly decelerated motion shall not be stopped according to the characteristic of constantly decelerated motion, however, since the display location after previous updating has already gone beyond the range of optimum display locations, adjusting with constantly decelerated motion will be stopped and instead the flow goes to a process of adjusting the current display location to an optimum display location, particularly as described in the operations S509 to S511.

The operation S507 is to wait for subsequent expiration of the timer, and the flow goes back to the operation S503;

The operation S508 is to determines the distance $S_{total}$ (between the current display location and the optimum display location respectively in the following scenarios:

$w \neq 0$ with $n \leq h$ indicates that the menu shall be but is not displayed at the top, and at this time let $S_{total} = |w|$;

$w < 0$ with $n > h$ indicates that the menu shall be but is not displayed at the top and there is a blank at the upper portion of a display area, and at this time let $S_{total} = |w|$; and $w > (n-h)$ with $n > h$ indicates that the menu shall be but is not displayed at the bottom and there is a blank at the lower portion of a display area, and at this time let $S_{total} = w - (n-h)$.

A scenario other than any of the foregoing scenarios indicates that the display location has been an optimum location and it is not necessary to continue with adjusting any more but the flow goes directly to the operation S512; otherwise, the flow goes to the operation S509 of adjusting the display location to an optimum one;

The operation S509 is to determine an adjusting step $S_{step}$:

$$S_{step} = S_{total}/2 \quad (5)$$

Adjusting of the display location to an optimum display location shall also a gradually adjusting process instead of one-off transitioning to an optimum display location therefore each adjusting step is not $S_{total}$ but the product of $S_{total}$ and a weight preset smaller than 1, e.g., ½, ⅓, etc., as long as the reciprocal thereof is an integer number. The weight may be fixed, for example, the product of $S_{total}$ and the same weight is taken as an adjusting step for each instance of adjusting, or the weight may not be fixed, for example, it may be ½ for the first adjusting, ⅓ for the second adjusting, and so on for gradual decreasing thereof.

Decremental adjusting taking $S_{step}$ as an adjusting step may necessitate a large number of instances of adjusting to an optimum display location, and in order to avoid a long period of time for adjusting, an minimum adjusting step can be predetermined, therefore each calculated $S_{step}$ can further be compared with the predetermined minimum adjusting step $S_{min}$, and the larger one of them will be taken as a current adjusting step.

The operation S510 is to determine the target display location of the menu from the sliding direction of the control body in the last phase determined from the space of samples, the current display location of the menu and $S_{step}$ and to update the menu with the target display location;

The target display location of the menu shall be the current display location plus $S_{step}$ and the display location of the updated menu will be w=w+$S_{step}$ when the sliding direction of the control body in the last phase is upward, and on the contrary the target display location of the menu shall be the current display location minus $S_{step}$ and the display location of the updated menu will be w=w−$S_{step}$ when the sliding direction of the control body in the last phase is downward.

The operation S511 is to wait for subsequent expiration of the timer, and then the flow goes back to the operation S508; and The operation S512 is to enable the timer, and then the complete process of adjusting the interface with inertial sliding ends.

It shall be noted that the foregoing adjusting process is merely a specific example in which the calculated parameters $v_0$ and $a_0$ can be adjusted correspondingly by being multiplied with an experiential coefficient in view of a real operation effect as desired of a display interface of a mobile communication terminal so that a real sliding effect of a menu on the mobile communication terminal will better adapt to a desired experience of a user.

It shall be noted that both $v_0$ and $a_0$ are floating point numbers for calculation, and the calculated $S_0$ is also a floating point number, however, since the display interface of the mobile communication terminal is correspondingly in unit of pixel, rounding up or down of $S_0$ is needed and is sufficient for an application thereof to the sliding distance of the interface. Floating point operations including those of calculating the acceleration and the initial speed before the control body is released are performed throughout calculation in order to maintain precision of calculation.

It shall be noted that the method for updating a display interface according to the invention can be used on any multimedia electronic device with a touch screen, particularly a mobile communication terminal.

Evidently those skilled in the art can make various modifications and variations to the embodiments of the invention without departing from the scope of the invention. Thus the invention is also intended to encompass these modifications and variations thereto provided that the modifications and variations come into the scope of the claims appended to the invention and their equivalents.

The invention claimed is:

1. A method for updating an interface of a touch screen, comprising:
 a first operation of determining, from location information on coordinates of and time information on a last preset number of sampled pixel points through which a sliding trace of a control body sliding on the touch screen passes, a distance over which and a period of time in which the control body slides from the first one to the last one of the sampled pixel points in a movement direction of the display interface;
 a second operation of determining, from the distance and the period of time, the highest speed $v_0$ at which the control body slides with a zero initial speed and a constant acceleration $a_0$ starting from the first sampled pixel point to the last sampled pixel point and the acceleration $a_0$; and
 a third operation of periodically determining a step by which a menu is adjusted and updating the display interface at a preset interval T of updating the interface assuming that the interface slides starting with an initial speed of $v_0$ or of the product of $v_0$ and a first weight and with a deceleration of $a_0$ or of the product of $a_0$ and a second weight after the control body is released so that the display interface is updated with an effect of decelerated sliding until it stops at an optimum display location, wherein a period of time in which the interface slides between two consecutive instances of updating thereof is preset to $T_0$.

2. The method of claim 1, wherein the first operation comprises:
 determining the size of a space of sampled pixel points and clearing the space of sampled pixel points upon capturing a signal that the touch screen is touched with the control body;
 sampling the sliding trace of the control body while being dragged, acquiring the location information on the coordinates of the sampled pixel points and the time information when the pixel points are passed through and updating the space of samples constantly;
 determining, from the location information on the coordinates of the first sampled pixel point in the space of samples to come into the space of samples and the last sampled pixel point to come into the space of samples, the distance $s_0$ over which the control body slides from the first one to the last one of the sampled pixel points in the movement direction of the display interface after the control body is released from the touch screen; and
 determining, from the time information on the first sampled pixel point and the last sampled pixel point, the period of time $t_0$ in which the control body slides from the first sampled pixel point to the last sampled pixel point.

3. The method of claim 2, wherein the second operation comprises: $a_0=2s_0/t_0^2$ and $v_0=a_0t_0$.

4. The method of claim 1, wherein the second operation comprises: $a_0=2s_0/t_0^2$ and $v_0=a_0t_0$.

5. The method of claim 1, wherein in the third operation, the display interface slides starting with an initial speed of $v_0$ and with a deceleration of $a_0$ after the control body is released, and the third operation comprises:
 B11. triggering a timer for an interval at which the interface is updated, wherein the time-length of the timer is T;
 B12. waiting for expiration of the timer;
 B13. calculating from $a_0$, $v_0$ and $T_0$ the distance s over which the menu slides in a period of time $T_0$ and the speed v' at which the menu slides at the end of the period of time $T_0$, wherein:

$s=v_0T_0-a_0T_0^2/2$; and $v'=v_0-a_0T_0$;

B14. assigning v' to $v_0$, i.e., $v_0=v'$;
 B15. if one of the following four conditions is satisfied, then an operation B17 is executed; otherwise, determining a target display location of the menu from the sliding direction of the control body determined from a space of samples, the current display location of the menu and s, and updating the menu with the target display location;
 the first condition of $s\le 0$;
 the second condition of $v_0 \le 0$;
 the third condition of $w \ne 0$ with $n \le h$; and
 the fourth condition of $w<0$ or $w>(n-h)$ with $n>h$;
 wherein w represents the location at which the contents of the menu are currently displayed, the height of the entire menu is a number, n, of pixels, and the height of a menu area of the touch screen is a number, h, of pixels;
 B16. waiting for subsequent expiration of the timer, and then going back to the operation B13;
 B17. determining whether none of the following conditions is satisfied, and if so, then ending; otherwise, determining the distance $S_{total}$ between the current display location and the optimum display location, wherein:
 $S_{total}=|w|$ for the condition of $w \ne 0$ with $n \le h$;
 $S_{total}=|w|$ for the condition of $w<0$ with $n>h$; and
 $S_{total}=w-(n-h)$ for the condition of $w>(n-h)$ with $n>h$;

B18. determining an adjusting step $S_{step}$ as $S_{step}=S_{total}/Q$ wherein Q is an integer number larger than zero;

B19. determining the target display location of the menu from the sliding direction of the control body in the last phase determined from the space of samples, the current display location of the menu and $S_{step}$, and updating the menu with the target display location; and B110. waiting for subsequent expiration of the timer and then going back to the operation B17.

6. The method of claim 1, wherein in the third operation, the display interface slides starting with an initial speed of $v_0$ and with a deceleration of $a_0$ after the control body is released, and the third operation comprises:

B21. triggering a timer for an interval at which the interface is updated, wherein the time-length of the timer is T;

B22. waiting for expiration of the timer;

B23. calculating from $a_0$, $v_0$ and $T_0$ the distance s over which the menu slides in a period of time $T_0$ and the speed v' at which the menu slides at the end of the period of time $T_0$, wherein:

$$s=v_0T_0-a_0T_0^2/2; \text{ and}$$

$$v'=v_0-a_0T_0;$$

B24. assigning v' to $v_0$, i.e., $v_0=v'$;

B25. if one of the following four conditions is satisfied, then an operation B27 is executed; otherwise, determining a target display location of the menu from the sliding direction of the control body determined from a space of samples, the current display location of the menu and s, and updating the menu with the target display location;

the first condition of s≤0;

the second condition of $v_0$≤0;

the third condition of w≠0 with n≤h; and the fourth condition of w<0 or w>(n−h) with n>h;

wherein w represents the location at which the contents of the menu are currently displayed, the height of the entire menu is a number, n, of pixels, and the height of a menu area of the touch screen is a number, h, of pixels;

B26. waiting for subsequent expiration of the timer, and then going back to the operation B23;

B27. determining whether none of the following conditions is satisfied, and if so, then ending; otherwise, determining the distance $S_{total}$ between the current display location and the optimum display location, wherein:

$S_{total}=|w|$ for the condition of w≠0 with n≤h;

$S_{total}=|w|$ for the condition of w<0 with n>h; and $S_{total}=w-(n-h)$ for the condition of w>(n−h) with n>h;

B28. determining an adjusting step $S_{step}$ as $S_{step}=S_{total}/Q$, wherein Q is an integer larger than zero, and when $S_{step}$ is smaller than a preset minimum adjusting step $S_{min}$, determining $S_{step}$ as $S_{min}$;

B29. determining the target display location of the menu from the sliding direction of the control body in the last phase determined from the space of samples, the current display location of the menu and $S_{step}$, and updating the menu with the target display location; and B210. waiting for subsequent expiration of the timer and then going back to the operation B27.

7. The method of claim 1, wherein in the third operation, the display interface slides starting with an initial speed of the product $v_0'$ of $v_0$ and the first weight and with a deceleration of the product $a_0'$ of $a_0$ and the second weight after the control body is released, and the third operation comprises:

B31. triggering a timer for an interval at which the interface is updated, wherein the time-length of the timer is T;

B32. waiting for expiration of the timer;

B33. calculating from $a_0'$, $v_0'$ and $T_0$ the distance s over which the menu slides in a period of time $T_0$ and the speed v' at which the menu slides at the end of the period of time $T_0$, wherein:

$$s=v_0'T_0-a_0'T_0^2/2; \text{ and}$$

$$v'=v_0'-a_0'T_0;$$

B34. assigning v' to $v_0$, i.e., $v_0=v'$;

B35. if one of the following four conditions is satisfied, then an operation B37 is executed; otherwise, determining a target display location of the menu from the sliding direction of the control body determined from a space of samples, the current display location of the menu and s, and updating the menu with the target display location;

the first condition of s≤0;

the second condition of $v_0$≤0;

the third condition of w≠0 with n≤h; and the fourth condition of w<0 or w>(n−h) with n>h;

wherein w represents the location at which the contents of the menu are currently displayed, the height of the entire menu is a number, n, of pixels, and the height of a menu area of the touch screen is a number, h, of pixels;

B36. waiting for subsequent expiration of the timer, and then going back to the operation B33;

B37. determining whether none of the following conditions is satisfied, and if so, then ending; otherwise, determining the distance $S_{total}$ between the current display location and the optimum display location, wherein:

$S_{total}=|w|$ for the condition of w≠0 with n≤h;

$S_{total}=|w|$ for the condition of w<0 with n>h; and $S_{total}=w-(n-h)$ for the condition of w>(n−h) with n>h;

B38. determining an adjusting step $S_{step}$ as $S_{step}=S_{total}/Q$, wherein Q is an integer larger than zero;

B39. determining the target display location of the menu from the sliding direction of the control body in the last phase determined from the space of samples, the current display location of the menu and $S_{step}$, and updating the menu with the target display location; and B310. waiting for subsequent expiration of the timer and then going back to the operation B37.

8. The method of claim 1, wherein in the third operation, the display interface slides starting with an initial speed of the product $v_0'$ of $v_0$ and the first weight and with a deceleration of the product $a_0'$ of $a_0$ and the second weight after the control body is released, and the third operation comprises:

B41. triggering a timer for an interval at which the interface is updated, wherein the time-length of the timer is T;

B42. waiting for expiration of the timer;

B43. calculating from $a_0'$, $v_0'$ and $T_0$ the distance s over which the menu slides in a period of time $T_0$ and the speed v' at which the menu slides at the end of the period of time $T_0$, wherein:

$$s=v_0'T_0-a_0'T_0^2/2; \text{ and}$$

$$v'=v_0'-a_0'T_0;$$

B44. assigning v' to $v_0$, i.e., $v_0=v'$;

B45. if one of the following four conditions is satisfied, then an operation B47 is executed; otherwise, determining a target display location of the menu from the sliding direction of the control body determined from a space of samples, the current display location of the menu and s and updating the menu with the target display location;

the first condition of s≤0;

the second condition of $v_0$≤0;

the third condition of $w \neq 0$ with $n \leq h$; and the fourth condition of $w<0$ or $w>(n-h)$ with $n>h$;

wherein w represents the location at which the contents of the menu are currently displayed, the height of the entire menu is a number, n, of pixels, and the height of a menu area of the touch screen is a number, h, of pixels;

B46. waiting for subsequent expiration of the timer, and then going back to the operation B43;

B47. determining whether none of the following conditions is satisfied, and if so, then ending; otherwise, determining the distance $S_{total}$ between the current display location and the optimum display location, wherein:

$S_{total}=|w|$ for the condition of $w \neq 0$ with $n \leq h$;

$S_{total}=|w|$ for the condition of $w<0$ with $n>h$; and $S_{total}=w-(n-h)$ for the condition of $w>(n-h)$ with $n>h$;

B48. determining an adjusting step $S_{step}$ as $S_{step}=S_{total}/Q$, wherein Q is an integer larger than zero, and when $S_{step}$ is smaller than a preset minimum adjusting step $S_{min}$, determining $S_{step}$ as $S_{min}$;

B49. determining the target display location of the menu from the sliding direction of the control body in the last phase determined from the space of samples, the current display location of the menu and $S_{step}$, and updating the menu with the target display location; and B410. waiting for subsequent expiration of the timer and then going back to the operation B47.

9. The method of claim 1, wherein T and $T_0$ are equal.

10. A non-transitory computer readable storage medium having instructions thereon for performing the method of claim 1.

11. A multimedia electronic device, comprising:

a first determination unit for determining, from location information on coordinates of and time information on a last preset number of sampled pixel points through which a sliding trace of a control body sliding on a touch screen passes, a distance over which and a period of time in which the control body slides from the first one to the last one of the sampled pixel points in a movement direction of a display interface;

a second determination unit for determining, from the distance and the period of time, the highest speed $v_0$ at which the control body slides with a zero initial speed and a constant acceleration $a_0$ starting from the first sampled pixel point to the last sampled pixel point and the acceleration $a_0$; and a determination and updating unit for periodically determining a step by which a menu is adjusted and updating the display interface at a preset interval T of updating the interface assuming that the interface slides starting with an initial speed of $v_0$ or of the product of $v_0$ and a first weight and with a deceleration of $a_0$ or of the product of $a_0$ and a second weight after the control body is released so that the display interface is updated with an effect of decelerated sliding until it stops at an optimum display location, wherein a period of time in which the interface slides between two consecutive instances of updating thereof is preset to $T_0$.

12. The multimedia electronic device of claim 11, wherein the multimedia electronic device is a mobile communication terminal.

13. The multimedia electronic device of claim 11, wherein, the first determination unit comprises:

a sub-unit for determining the size of a space of sampled pixel points and clearing the space of sampled pixel points upon capturing a signal that the touch screen is touched with the control body;

a sub-unit for sampling the sliding trace of the control body while being dragged, acquiring the location information on the coordinates of the sampled pixel points and the time information when the pixel points are passed through and updating the space of samples constantly;

a sub-unit for determining, from the location information on the coordinates of the first sampled pixel point in the space of samples to come into the space of samples and the last sampled pixel point to come into the space of samples, the distance $s_0$ over which the control body slides from the first one to the last one of the sampled pixel points in the movement direction of the display interface after the control body is released from the touch screen; and a sub-unit for determining, from the time information on the first sampled pixel point and the last sampled pixel point, the period of time $t_0$ in which the control body slides from the first sampled pixel point to the last sampled pixel point.

14. The multimedia electronic device of claim 13, wherein, the second determination unit comprises:

a sub-unit for determining $a_0=2s_0/t_0^2$; and a sub-unit for determining $v_0=a_0t_0$.

15. The multimedia electronic device of claim 11, wherein, the second determination unit comprises:

a sub-unit for determining $a_0=2s_0/t_0^2$; and a sub-unit for determining $v_0=a_0t_0$.

16. The multimedia electronic device of claim 11, wherein, assuming that the interface slides starting with an initial speed of $v_0$ and with a deceleration of $a_0$ after the control body is released, the determination and updating unit is particularly configured to perform the following operations:

B11. triggering a timer for an interval at which the interface is updated, wherein the time-length of the timer is T;

B12. waiting for expiration of the timer;

B13. calculating from $a_0$, $v_0$ and $T_0$ the distance s over which the menu slides in a period of time $T_0$ and the speed v' at which the menu slides at the end of the period of time $T_0$, wherein:

$s=v_0T_0-a_0T_0^2/2$; and $v'=v_0-a_0T_0$;

B14. assigning v' to $v_0$, i.e., $v_0=v'$;

B15. if one of the following four conditions is satisfied, then an operation B17 is executed; otherwise, determining a target display location of the menu from the sliding direction of the control body determined from a space of samples, the current display location of the menu and s, and updating the menu with the target display location;

the first condition of $s \leq 0$;

the second condition of $v_0 \leq 0$;

the third condition of $w<0$ with $n \leq h$; and the fourth condition of $w<0$ or $w>(n-h)$ with $n>h$;

wherein w represents the location at which the contents of the menu are currently displayed, the height of the entire menu is a number, n, of pixels, and the height of a menu area of the touch screen is a number, h, of pixels;

B16. waiting for subsequent expiration of the timer, and then going back to the operation B13;

B17. determining whether none of the following conditions is satisfied, and if so, then ending; otherwise, determining the distance $S_{total}$ between the current display location and the optimum display location, wherein:

$S_{total}=|w|$ for the condition of $w \neq 0$ with $n \leq h$;

$S_{total}=|w|$ for the condition of $w<0$ with $n>h$; and $S_{total}=w-(n-h)$ for the condition of $w>(n-h)$ with $n>h$;

B18. determining an adjusting step $S_{step}$ as $S_{step}=S_{total}/Q$, wherein Q is an integer number larger than zero;

B19. determining the target display location of the menu from the sliding direction of the control body in the last phase determined from the space of samples, the current display location of the menu and $S_{step}$, and updating the menu with the target display location; and B110. waiting for subsequent expiration of the timer and then going back to the operation B17.

17. The multimedia electronic device of claim 11, wherein, assuming that the interface slides starting with an initial speed of $v_0$ and with a deceleration of $a_0$ after the control body is released, the determination and updating unit is particularly configured to perform the following operations:

B21. triggering a timer for an interval at which the interface is updated, wherein the time-length of the timer is T;

B22. waiting for expiration of the timer;

B23. calculating from $a_0$, $v_0$ and $T_0$ the distance s over which the menu slides in a period of time $T_0$ and the speed v' at which the menu slides at the end of the period of time $T_0$, wherein:

$$s=v_0 T_0-a_0 T_0^2/2; \text{ and}$$

$$v'=v_0-a_0 T_0;$$

B24. assigning v' to $v_0$, i.e., $v_0=v'$;

B25. if one of the following four conditions is satisfied, then an operation B27 is executed; otherwise, determining a target display location of the menu from the sliding direction of the control body determined from a space of samples, the current display location of the menu and s, and updating the menu with the target display location;
the first condition of $s \leq 0$;
the second condition of $v_0 \leq 0$;
the third condition of $w \neq 0$ with $n \leq h$; and
the fourth condition of $w<0$ or $w>(n-h)$ with $n>h$;
wherein w represents the location at which the contents of the menu are currently displayed, the height of the entire menu is a number, n, of pixels, and the height of a menu area of the touch screen is a number, h, of pixels;

B26. waiting for subsequent expiration of the timer, and then going back to the operation B23;

B27. determining whether none of the following conditions is satisfied, and if so, then ending; otherwise, determining the distance $S_{total}$ between the current display location and the optimum display location, wherein:
$S_{total}=|w|$ for the condition of $w \neq 0$ with $n \leq h$;
$S_{total}=|w|$ for the condition of $w<0$ with $n>h$; and
$S_{total}=w-(n-h)$ for the condition of $w>(n-h)$ with $n>h$;

B28. determining an adjusting step $S_{step}$ as $S_{step}=S_{total}/Q$, wherein Q is an integer larger than zero, and when $S_{step}$ is smaller than a preset minimum adjusting step $S_{min}$, determining $S_{step}$ as $S_{min}$;

B29. determining the target display location of the menu from the sliding direction of the control body in the last phase determined from the space of samples, the current display location of the menu and $S_{step}$, and updating the menu with the target display location; and B210. waiting for subsequent expiration of the timer and then going back to the operation B27.

18. The multimedia electronic device of claim 11, wherein, assuming that the interface slides starting with an initial speed of the product $v_0'$ of $v_0$ and the first weight and with a deceleration of the product $a_0'$ of $a_0$ and the second weight after the control body is released, the determination and updating unit is particularly configured to perform the following operations:

B31. triggering a timer for an interval at which the interface is updated, wherein the time-length of the timer is T;

B32. waiting for expiration of the timer;

B33. calculating from $a_0'$, $v_0'$ and $T_0$ the distance s over which the menu slides in a period of time $T_0$ and the speed v' at which the menu slides at the end of the period of time $T_0$, wherein:

$$s=v_0'T_0-a_0'T_0^2/2; \text{ and}$$

$$v'=v_0'-a_0'T_0;$$

B34. assigning v' to $v_0$, i.e., $v_0=v'$;

B35. if one of the following four conditions is satisfied, then an operation B37 is executed; otherwise, determining a target display location of the menu from the sliding direction of the control body determined from a space of samples, the current display location of the menu and s, and updating the menu with the target display location;
the first condition of $s \leq 0$;
the second condition of $v_0 \leq 0$;
the third condition of $w \neq 0$ with $n \leq h$; and
the fourth condition of $w<0$ or $w>(n-h)$ with $n>h$;
wherein w represents the location at which the contents of the menu are currently displayed, the height of the entire menu is a number, n, of pixels, and the height of a menu area of the touch screen is a number, h, of pixels;

B36. waiting for subsequent expiration of the timer, and then going back to the operation B33;

B37. determining whether none of the following conditions is satisfied, and if so, then ending; otherwise, determining the distance $S_{total}$ between the current display location and the optimum display location, wherein:
$S_{total}=|w|$ for the condition of $w \neq 0$ with $n \leq h$;
$S_{total}=|w|$ for the condition of $w<0$ with $n>h$; and
$S_{total}=w-(n-h)$ for the condition of $w>(n-h)$ with $n>h$;

B38. determining an adjusting step $S_{step}$ as $S_{step}=S_{total}/Q$, wherein Q is an integer larger than zero;

B39. determining the target display location of the menu from the sliding direction of the control body in the last phase determined from the space of samples, the current display location of the menu and $S_{step}$, and updating the menu with the target display location; and B310. waiting for subsequent expiration of the timer and then going back to the operation B37.

19. The multimedia electronic device of claim 11, wherein, assuming that the interface slides starting with an initial speed of the product $v_0'$ of $v_0$ and the first weight and with a deceleration of the product $a_0'$ of $a_0$ and the second weight after the control body is released, the determination and updating unit is particularly configured to perform the following operations:

B41. triggering a timer for an interval at which the interface is updated, wherein the time-length of the timer is T;

B42. waiting for expiration of the timer;

B43. calculating from $a_0'$, $v_0'$ and $T_0$ the distance s over which the menu slides in a period of time $T_0$ and the speed v' at which the menu slides at the end of the period of time $T_0$, wherein:

$$s=v_0'T_0-a_0'T_0^2/2; \text{ and}$$

$$v'=v_0'-a_0'T_0;$$

B44. assigning v' to $v_0$, i.e., $v_0=v'$;

B45. if one of the following four conditions is satisfied, then an operation B47 is executed; otherwise, determining a target display location of the menu from the sliding direction of the control body determined from a space of samples, the current display location of the menu and s and updating the menu with the target display location;

the first condition of $s \leq 0$;

the second condition of $v_0 \leq 0$;

the third condition of $w \neq 0$ with $n \leq h$; and the fourth condition of $w < 0$ or $w > (n-h)$ with $n > h$;

wherein w represents the location at which the contents of the menu are currently displayed, the height of the entire menu is a number, n, of pixels, and the height of a menu area of the touch screen is a number, h, of pixels;

B46. waiting for subsequent expiration of the timer, and then going back to the operation B43;

B47. determining whether none of the following conditions is satisfied, and if so, then ending; otherwise, determining the distance $S_{total}$ between the current display location and the optimum display location, wherein:

$S_{total} = |w|$ for the condition of $w \neq 0$ with $n \leq h$;

$S_{total} = |w|$ for the condition of $w < 0$ with $n > h$; and $S_{total} = w - (n-h)$ for the condition of $w > (n-h)$ with $n > h$;

B48. determining an adjusting step $S_{step}$ as $S_{step} = S_{total}/Q$, wherein Q is an integer larger than zero, and when $S_{step}$ is smaller than a preset minimum adjusting step $S_{min}$, determining $S_{step}$ as $S_{min}$;

B49. determining the target display location of the menu from the sliding direction of the control body in the last phase determined from the space of samples, the current display location of the menu and $S_{step}$, and updating the menu with the target display location; and B410. waiting for subsequent expiration of the timer and then going back to the operation B47.

20. The multimedia electronic device of claim 11, wherein T and $T_0$ are equal.

* * * * *